United States Patent [19]
Field

[11] Patent Number: 6,059,967
[45] Date of Patent: May 9, 2000

[54] DISTRIBUTOR DEVICE FOR WATER CONDITIONER BACKFLUSH APPARATUS

[75] Inventor: George Raymond Field, Edmonton, Canada

[73] Assignee: Big Iron Drilling Ltd., Edmonton, Canada

[21] Appl. No.: 09/081,638

[22] Filed: May 20, 1998

[51] Int. Cl.⁷ .................................................. B01D 35/00
[52] U.S. Cl. .......................... 210/247; 210/275; 210/279; 210/289; 210/291; 210/427; 210/456
[58] Field of Search .................... 210/289, 291, 210/247, 456, 275, 427, 279

[56] References Cited

U.S. PATENT DOCUMENTS

| | | |
|---|---|---|
| 2,173,305 | 9/1939 | Marx .......................................... 135/22 |
| 3,240,699 | 3/1966 | Duff et al. . |
| 3,395,099 | 7/1968 | Johnson . |
| 3,402,126 | 9/1968 | Cioffi . |
| 3,429,443 | 2/1969 | Stern . |
| 3,451,554 | 6/1969 | Wade . |
| 3,455,458 | 7/1969 | Johnson . |
| 3,747,768 | 7/1973 | Barrera . |
| 4,919,802 | 4/1990 | Katsura .................................... 210/456 |
| 5,188,732 | 2/1993 | De Niel et al. .......................... 210/456 |
| 5,472,609 | 12/1995 | Field . |
| 5,582,719 | 12/1996 | Nagano .................................... 210/139 |

*Primary Examiner*—David A. Simmons
*Assistant Examiner*—Chester T. Barry
*Attorney, Agent, or Firm*—George A. Seaby

[57] ABSTRACT

A water conditioner includes a tank, and an apparatus for backflushing a bed of particulate material in the tank, which includes a tubular casing, a vertical tube in the casing, a cap on the top end of the casing, suitable valves for causing the flow of particulate material upwardly between the casing and tube, and then through a gap between the casing and cap during a backflush operation, and distributor device including a flexible, collapsible, umbrella-shaped body which is mounted on the casing immediately below the cap, and springs for biasing the body to the open position. Inlet tubes extend outwardly from the bottom of the casing approximately the same distance as the distributor for ensuring even distribution of liquid at the bottom of the bed.

7 Claims, 7 Drawing Sheets

DISTRIBUTOR DEVICE FOR WATER CONDITIONER BACKFLUSH APPARATUS

BACKGROUND OF THE INVENTION

Field of the Invention

This invention relates to a water conditioner apparatus such as a water softener or an iron and/or sulfur filter.

In general, water conditioners or iron and/or sulfur filters include a tank containing a particulate material for softening water by removing calcium and magnesium salts, or iron and/or sulfur from the water. Such apparatuses generally have four cycles of operation, including a service cycle in which water is filtered through a bed of particulate material for use, a backflush cycle in which contaminants are removed from the bed, and a regeneration cycle in which the particulate material is regenerated and a rinse cycle to stabilize and flush the bed.

During the service cycle, water flows in one direction through the bed and is discharged from the bed through a dip tube or the like. During backwashing, the flow of water is reversed, i.e., water flows in the other direction through the dip tube into the bed and upwardly to "lift" the bed, i.e. placing the bed in suspension and causing agitation to dislodge bed contaminants, which are drained from the top of the tank. During the regeneration cycle, fresh chemicals are introduced into the tank to recharge the particulate material. In the case of a water softener, the active ingredient introduced into the bed of particulate material is sodium or potassium chloride.

In the case of an iron and/or sulfur filter, potassium permanganate ($KMnO_4$) is used to regenerate the bed.

A problem with water conditioner apparatuses of the above described type is that of complete use of the bed of particulate material during each cycle of operation. Specifically, during the service and regeneration cycles, liquid flowing through the tank seldom contacts any more than 30–70% of the particulate material. Moreover, during backwashing recycled particulate bed material is often not evenly distributed in the tank, depleting or exhausting bed capacity unevenly and reducing bed efficiency. With conventional dip tube type apparatuses, it has been found that chemicals added during regeneration or salting cycle tend to hug the dip tube, contacting a relatively small proportion of the bed. The same thing happens in the service cycle.

A water conditioner and backwash device addressing this problem is described in detail in U.S. Pat. No. 5,472,609. This patent is incorporated herein by reference. Examples of other apparatuses of this type are found in U.S. Pat. No. 3,395,099, issued to R. D. Johnson on Jul. 30, 1968 and U.S. Pat. No. 3,455,458, issued to R. D. Johnson on Jul. 15, 1969. The Johnson devices employ separate, spaced apart tubes. In one embodiment of the Johnson inventions, during backwashing particulate mineral is drawn into one of the tubes in a limited area beneath the tube. The other Johnston device involves separate, parallel tubes or a spiral tube on a second tube. In each case, suction for backwashing is created by means of a fine nozzle. It has been found that such devices become clogged to the point of inoperability. Moreover, such prior art devices cannot be used with some commercial water treatment control valves with up flow brine controls, because the regenerative chemical will by-pass the bed by flowing up through the second tube, by passing the bed.

Devices for distributing fluid in particulate bed filter apparatuses are described in U.S. Pat. No. 3,240,699, issued to J. H. Duff et al on Mar. 15, 1966; U.S. Pat. No. 3,402,126, issued to Y. R. Cioffi on Sep. 17, 1968; U.S. Pat. No. 3,429,443, issued to H. B. Stern on Feb. 25, 1969; U.S. Pat. No. 3,451,554, issued to C. E. Wade on Jun. 24, 1969; U.S. Pat. No. 3,455,458, issued to R. D. Johnston on Jul. 15, 1969; U.S. Pat. No. 3,747,768, issued to S. E. Barrera on Jul. 14, 1973; and U.S. Pat. No. 3,809,247, issued to J. E. Brett on May 7, 1974.

Some of the distribution devices described in the above-identified patents are somewhat complicated and/or difficult (if not impossible) to install in existing particulate bed apparatus. Accordingly, a need still exists for an efficient distribution device which ensures even distribution of fluid and particulate solid during the service, regeneration and backwashing cycles of a water conditioner containing the bed.

GENERAL DESCRIPTION OF THE INVENTION

An object of the present invention is to improve upon existing water conditioners by providing a relatively simple distribution device for use in a water conditioner which is easy to install, and which effects even distribution of bed material and liquid during service, regeneration, backwashing and rinsing operations.

Accordingly, the present invention relates to a water conditioner comprising a tank for carrying a bed of particulate material; a backwash apparatus in the tank including a tubular casing in the bed; a vertical tube co-axial with said casing and extending through said casing beyond the ends thereof; a cap slidable on said vertical tube for movement between a closed position in which said cap closes an open top end of said casing and an open position in which said cap is spaced apart from said open top end of the casing; a first spring biasing said cap to the closed position; an opening in said tube for discharging water into said cap to cause the latter to move away from said casing to the open position; a first valve including a valve body closing the bottom end of said casing; inlet tubes on a bottom end of said valve body for introducing water from a large area of said bed into the bottom end of said first valve; a first passage in said body in fluid communication with the bottom end of said vertical tube, said first passage being normally open to the flow of water upwardly from the bed of particulate material into said vertical tube; ball means in said body for closing said first passage when the flow of water is reversed in said vertical tube; a second passage in the top of said body communicating with said first passage; a second valve normally closing said second passage for discharging water from said valve body when the flow of water is reversed in said vertical tube; a hood on said vertical tube above said valve body defining a venturi opening in the bottom end of said casing permitting the flow of particulate material into said casing, whereby, when during a backflush operation water is caused to flow downwardly in said tube means under pressure the first valve is closed with respect to the bed of particulate material, water passes through said first opening under pressure to move said cap to the open position, water passes through said second passage in said valve body to open said second valve, and water flows from the valve body upwardly into the bottom of said casing to create a venturi flow beneath said hood and in said casing which draws particulate material into the bottom end of said casing and discharges the water and particulate material through the open top end of the casing; and a distributor device including a collapsible body normally extending outwardly from immediately beneath said open top end of said casing in an open position; whereby, during the flow of liquid through said bed, said inlet tubes and said distributor ensures maximum contact between the liquid and the particulate material of the bed and, during backwashing of the bed, the distributor deflects particulate material towards the periphery of the bed to ensure even distribution of such particulate material.

BRIEF DESCRIPTION OF THE DRAWINGS

The invention is described below in greater detail with reference to the accompanying drawings, which illustrate a preferred embodiment of the invention, and wherein.

DESCRIPTION OF THE PREFERRED EMBODIMENT

Figure 1:
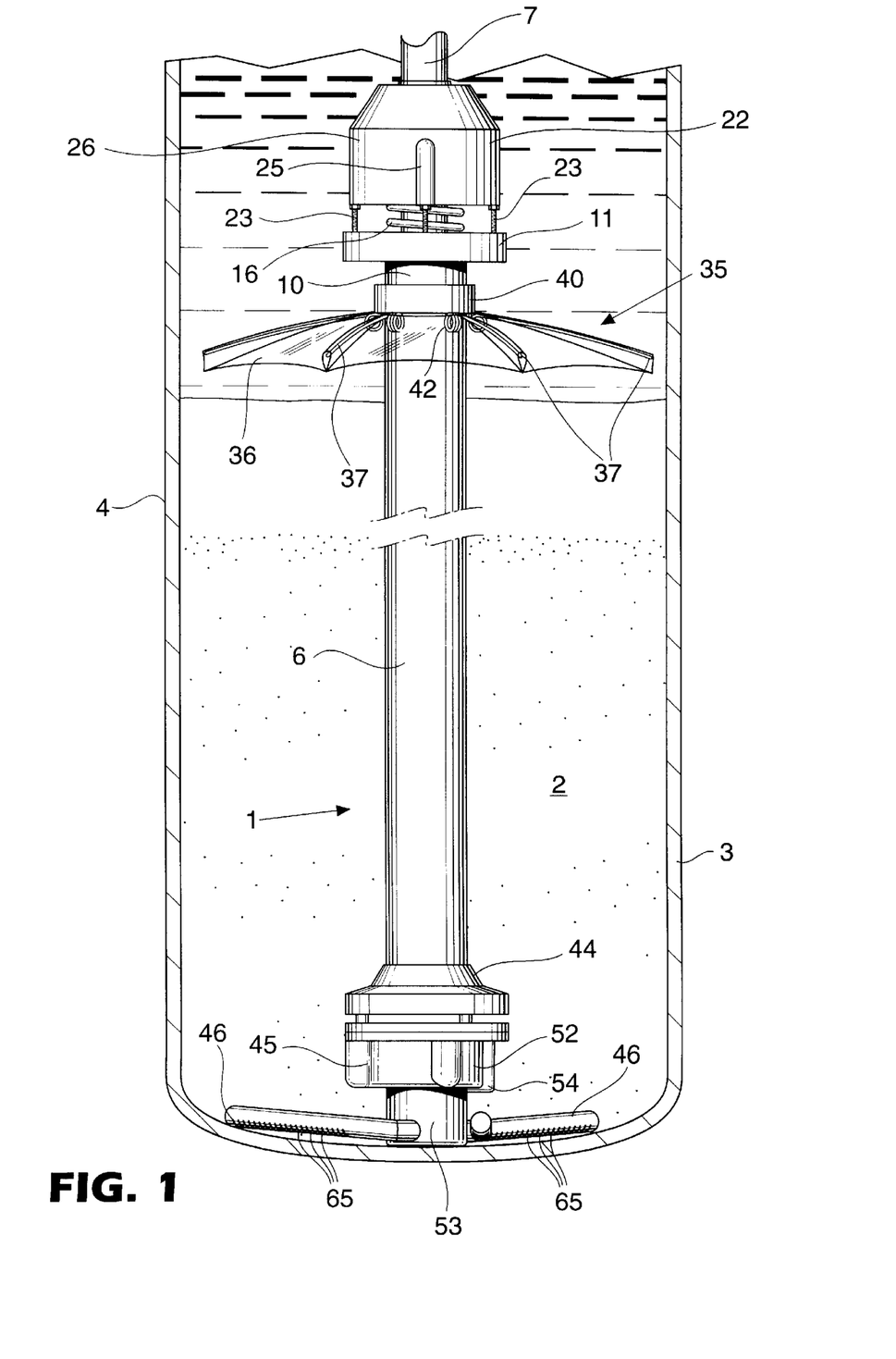
FIG. 1 is a schematic longitudinally sectional view of the bottom end of a water conditioner containing a backflush apparatus and a distributor device in accordance with the present invention.
Figure 2:
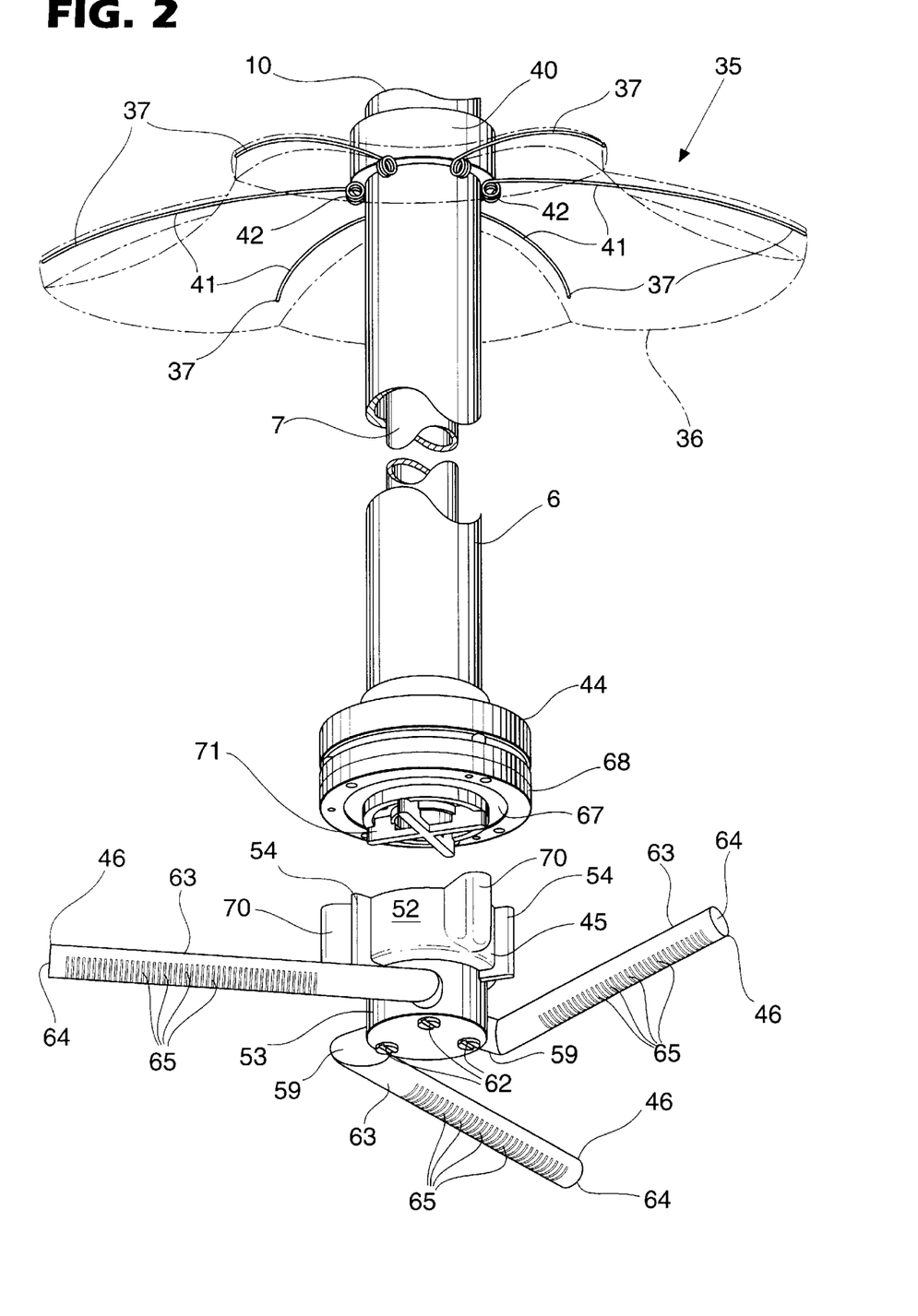
FIG. 2 is an isometric, partly exploded view of the backflush apparatus and the distributor device of FIG. 1 as seen from below with parts omitted.
Figure 3:
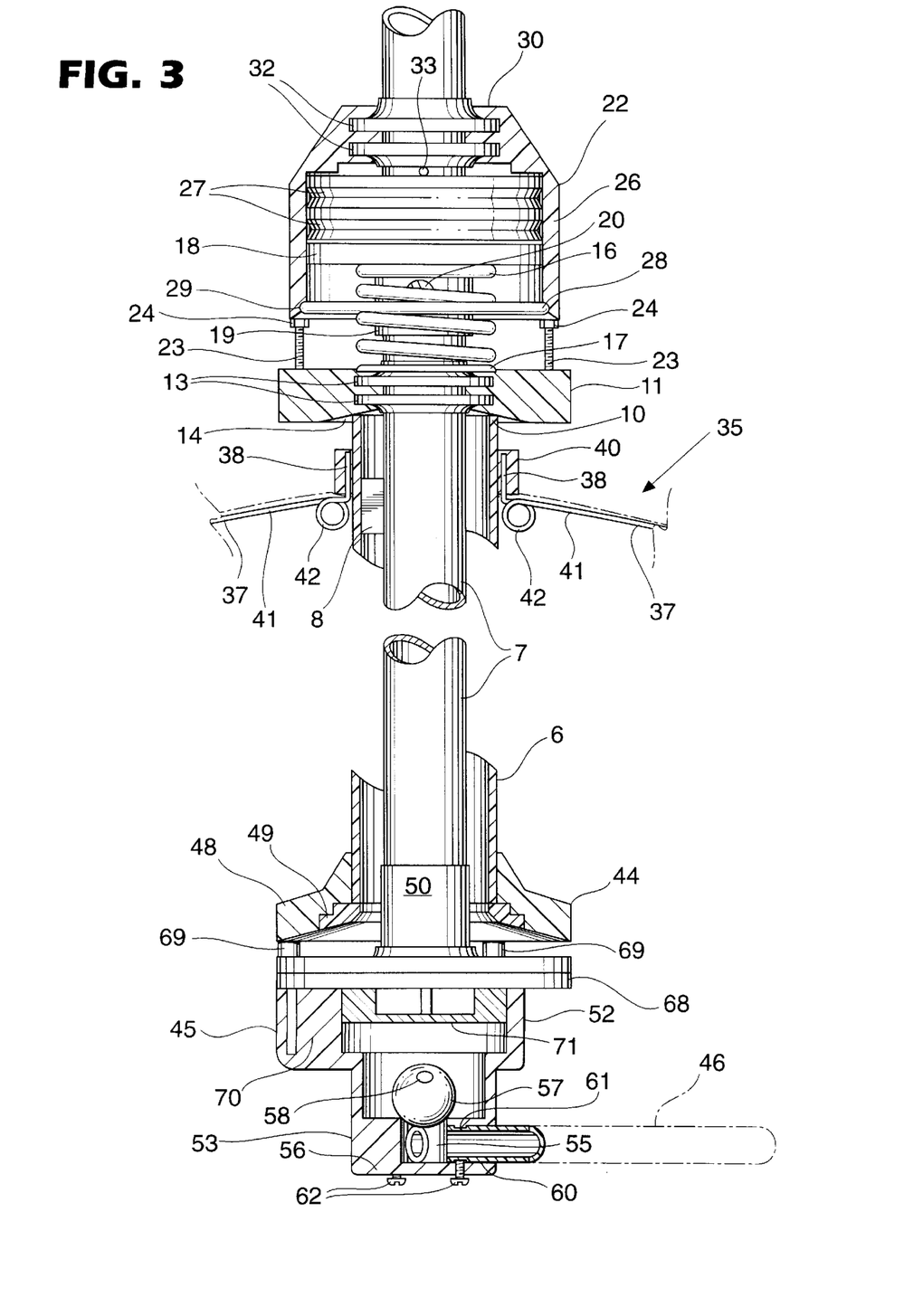
FIG. 3 is a longitudinal sectional view of the backflush apparatus and distributor device of FIG. 2.

With reference to FIGS. 1 to 3, a backwash apparatus of the type described in the inventor's earlier patent referred to above which is generally indicated at 1 is intended for use in a bed 2 of a particulate material mounted in the bottom end 3 of a water conditioner tank 4. The apparatus 1 includes an elongated, tubular casing 6. An elongated tube 7 extends through the casing 6 for carrying water into and out of the apparatus. The tube 7 is centered in the casing 6 by three fins 8 (one shown—FIG. 3) extending radially outwardly from the tube into contact with the casing 6. The fins 8 are spaced equidistant apart around the periphery of the tube 7.

Figure 4:
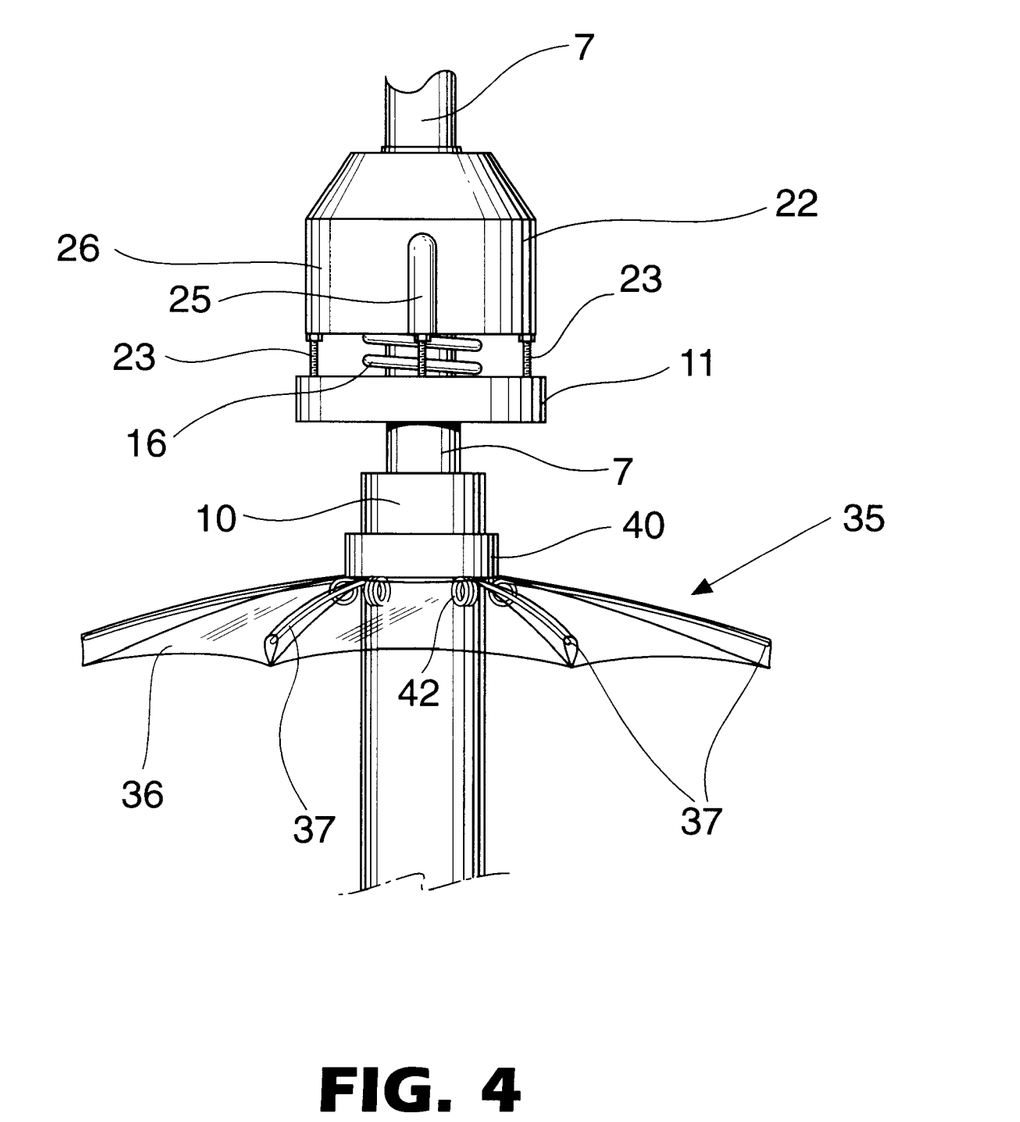
FIG. 4 is a side view of the top end of the backflush apparatus of FIGS. 1 to 3 in the open, backflush position.

The open top end 10 of the casing 6 is normally closed by a ring-shaped cap 11, which is slidably mounted on the tube 7. The cap 11 is sealed with respect to the tube 7 by means of annular lip seals 13. The bottom surface 14 of the cap 11 slopes upwardly and inwardly from its periphery for deflecting material expelled from the casing outwardly and downwardly. The cap 11 is biased to the down or closed position by a helical spring 16, the flattened bottom end of which is seated in a concave, annular groove 17 in the top of the cap 11. The spring 16 extends between the cap 11 and the main body 18 of a sleeve 19. The sleeve 19 is fixedly mounted on the tube 7 by means of a screw 20. The main body 18 of the sleeve 19 slidably supports a cap-shaped piston 22 for movement with the cap 11 between a closed position (FIGS. 1 and 3) and an open position (FIG. 4).

The piston 22 is connected to the cap 11 by bolts 23 extending through the ring and upwardly through nuts 24 (FIG. 3) into longitudinally extending projections 25 on the cylindrical side wall 26 of the piston 22. The piston 22 is sealed with respect to the body 18 of the sleeve 19 by annular lip seals 27 mounted in recesses in the sleeve.

Upward movement of the piston 22 is limited by a split ring 28 mounted in an annular groove 29 in the bottom end of the piston. As the piston 22 moves upwardly the ring 28 engages the lower end of the main body 18 of the sleeve 19 which stops the piston and consequently the cap 11. The top end 30 of the piston 22 is sealed with respect to the tube 7 by a pair of annular seals 32. A hole 33 is provided in the tube 7 between the upper end of the sleeve body 18 and the top end 30 of the piston 22. Water under pressure exiting the hole 33 causes the piston 22 and consequently the cap 11 to move upwardly.

As described hereinafter in greater detail, when the cap 11 moves upwardly during a backwash cycle of operation (FIG. 4), water and particulate material from the bed 2 escape from the open top end 10 of the casing 6. In order to ensure that the material is spread over a wide area of the tank 4, a distributor generally indicated at 35 is mounted on the casing 6 a short distance below the open top end 10 thereof. The distributor 35 is defined by a generally umbrella-shaped body 36 formed of an annular plastic sheet which is mounted on the casing 6 by means of a plurality of radially extending springs 37. Each spring 37 includes a short vertical arm 38 (FIG. 3) which is sandwiched between the casing 6 and a sleeve 40 to retain the springs against the casing 6. Slightly inclined, arcuate arms 41 extend radially outwardly from coils 42 at the bottom ends of the vertical arms 38 of the springs 37. The plastic body 36 is wrapped around the arms 41 and sealed to prevent movement of the body relative to the arms. The arms 41 and the coils 42 bias the body 36 upwardly to an open or extended position (FIGS. 1 and 2). During insertion into a narrow opening (not shown) in a tank top, the body 36 can be manually pressed down against the sides of the casing 6. Upon being released, the springs 37 return the body 36 to the umbrella-shape illustrated in the drawings.

As best shown in FIG. 3, the tube 7 extends downwardly beyond the bottom end of the casing 6. A hood 44 is mounted on the bottom end of the casing 6 above the bottom end of the tube 7. A bottom valve body 45 and inlet tubes 46 are mounted on the bottom end of the tube 7. The annular hood 44 includes a plastic body 48 with a harder plastic insert 49 in the bottom inner end thereof for protecting the bottom end of the casing 6. A stainless steel sleeve 50 is mounted on the bottom end of the tube 7 for protecting the latter. The sleeve 50 prevents holes forming in the side of the tube 7 when particulate material flowing rapidly into the gap between the hood 44 and the top of the valve body 45 strikes the tube 7.

The valve body 45 is generally cup-shaped, with cylindrical upper and lower portions 52 and 53, respectively. The upper portion 52 is slightly wider than the lower portion 53 and is reinforced by longitudinally extending ribs 54. A well 55 is provided in the thick bottom end 56 of the lower portion 53 for receiving water from the inlet tubes 46. The top of the well 55 is normally closed by a ball 57. A diametrically extending hole 58 is provided in the ball 57.

Figure 5:
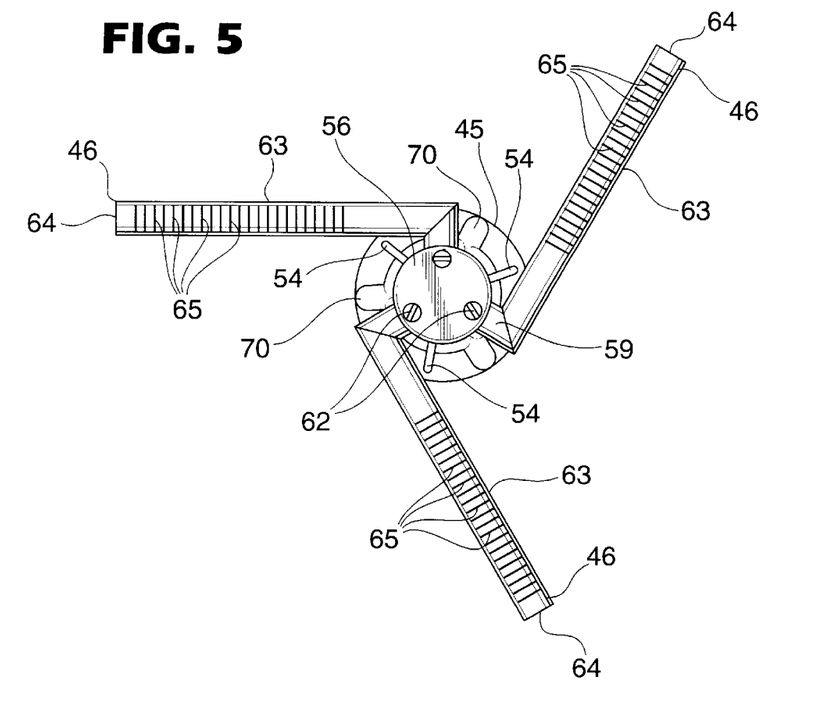
FIG. 5 is a bottom view of the backflush apparatus.

As best shown in FIG. 5, the inlet tubes 46 are tangential to the cylindrical lower portion 53 of the valve body 45. Each tube 46 is generally L-shaped, including a short inner arm 59 extending radially outwardly through an opening 60 (FIG. 3) in the bottom end 56 of the valve body 45. An annular groove 61 is provided in the short arm 59 of each tube 46. A screw 62 extending through the bottom end 56 into the groove 61 retains the tube 46 in the valve body 45. Thus, the tube 46 can be rotated around the longitudinal axis of the inner arm 46 for changing the inclination of the tube for insertion or removal from the tank 4. The longer arm 63 of each tube 46 has a closed outer end 64, and includes a plurality of narrow, transversely extending slits 65 along substantially the entire length thereof for admitting water into the valve body 45 from the bed 2 of particulate material while excluding the particulate material. The slits 65 extend from one side of each tube 46 around the top surface of the tube to the other side thereof. When the backflush apparatus is installed in a tank 4, the inlet tubes 46 are inclined slightly, the outer ends thereof resting against the bottom of the tank 4.

Figure 6:
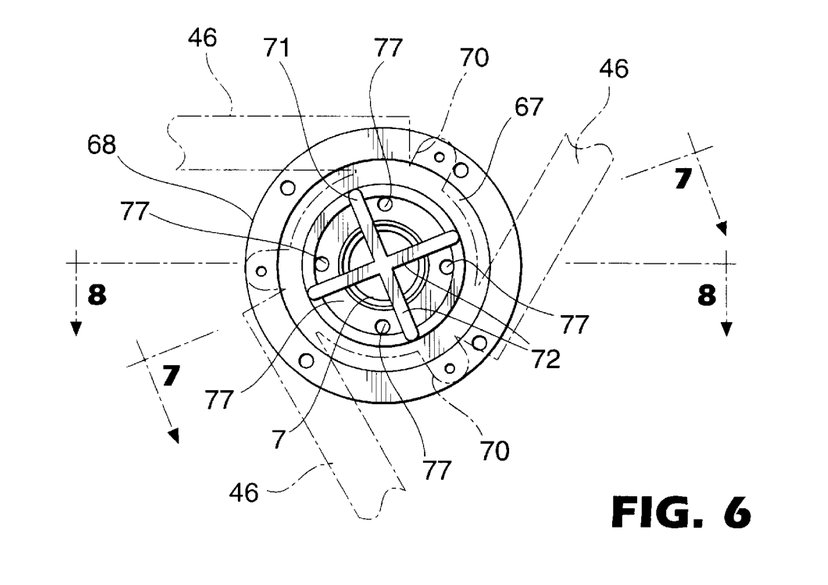
FIG. 6 is a bottom view of a valve used in the apparatus of FIGS. 1 to 3.
Figure 7:
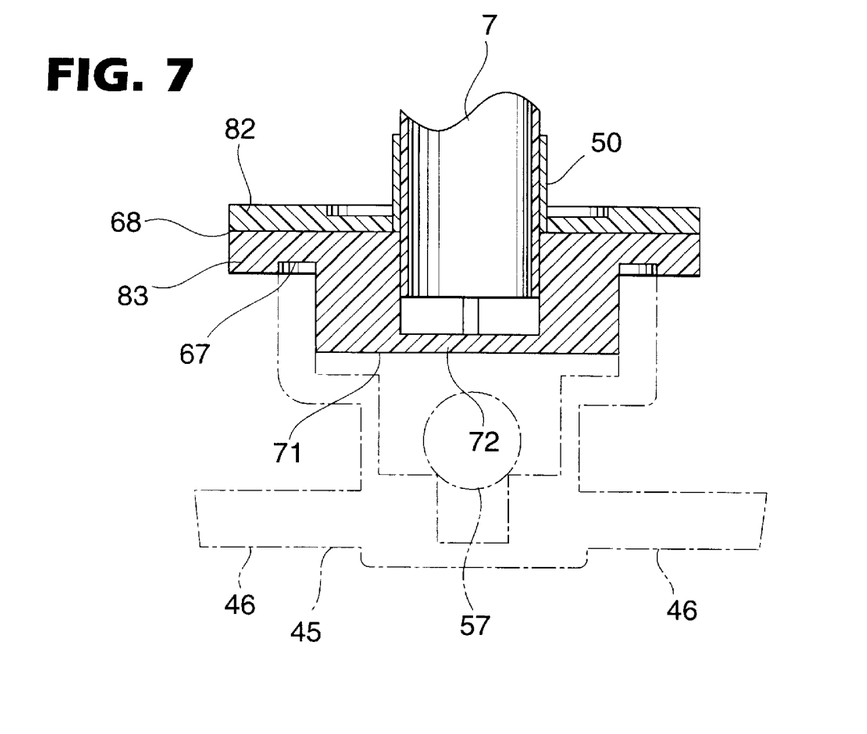
FIG. 7 is a cross section taken generally along line 7—7 of FIG. 6.
Figure 8:
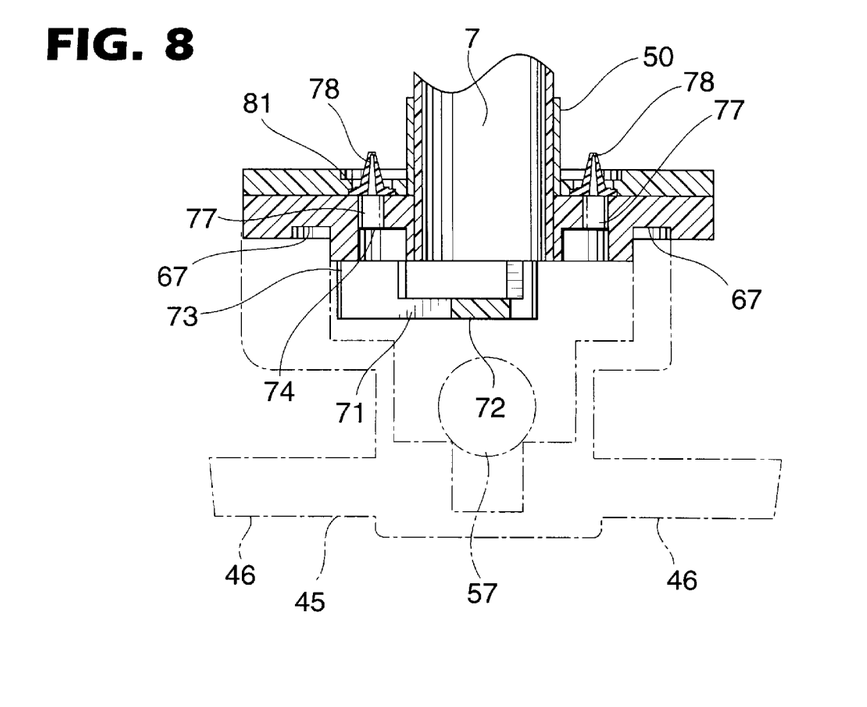
FIG. 8 is a cross section taken generally along line 8—8 of FIG. 6.

The top end of the valve body 45 extends into an annular groove 67 (FIGS. 2 and 7 to 9) in a top wall 68, which is attached to and surrounds the open bottom end of the tube 7. The ribs 54 limit movement of the valve body 45 into the groove 67. The top wall 68 is connected to and spaced from the hood 44 by sleeves 69 and screws (not shown) extending downwardly through the hood into sockets 70 on the valve body 45. The ball 57 is prevented from blocking the bottom end of the tube 7 by a cruciform spacer 71, which is integral with the top wall 68 of the valve. As best shown in FIGS. 2, 6 and 7, the spacer 71 includes L-shaped arms 72, the outer ends 73 of which extend upwardly into an annular groove 74 between the bottom end of the tube 7 and the inner side wall 76 of the groove 67.

During normal use of the device, water enters the top of the tank 4, passes downwardly through the bed 2 of particulate material and enters the tube 7 via the inlet tubes 46. The distributor 35 causes the water to move outwardly along the side wall of the tank. When passing the distributor 35, the water is evenly distributed across the entire area of the bed 2. While the exact dimensions are not critical, the distance between the distributor 35 and the top of the bed 2 is quite small (typically 2–4"). Moreover, the gap between the periphery of the distributor 35 and the side wall of the tank 4 is also small (typically ¾"). Thus, liquid is caused to pass around the distributor evenly to the entire top of the bed 2.

The tubes 46 extending outwardly approximately the same distance as the distributor 35 ensure that liquid is collected from virtually the whole cross section of the bed 2. Without the distributor 35, it is found that water, taking the path of least resistance tends to hug the sides of the casing 6, i.e., goes down the center of the bed 2 contacting the central portion only. The same is true when regenerating or salting the bed 2. The distributor 35 and the inlet tubes 46 ensure that the solution of chloride salt or potassium permanganate contacts substantially the entire area of the bed 2.

It will also be appreciated that the use of umbrella-shaped distributor 35 reduces the amount of freeboard above the bed 2, i.e. the spacing between the top of the bed 2 and the top of the tank 4. In conventional water conditioners in which the bed is backwashed by lifting the bed, the tank can be filled to 50–75% capacity, leaving room for bed stretch. With the apparatus described herein, the top of the piston 22 can be immediately beneath the top of the tank 4. Thus, 15 to 35% more bed material can be added to the tank.

Figure 9:
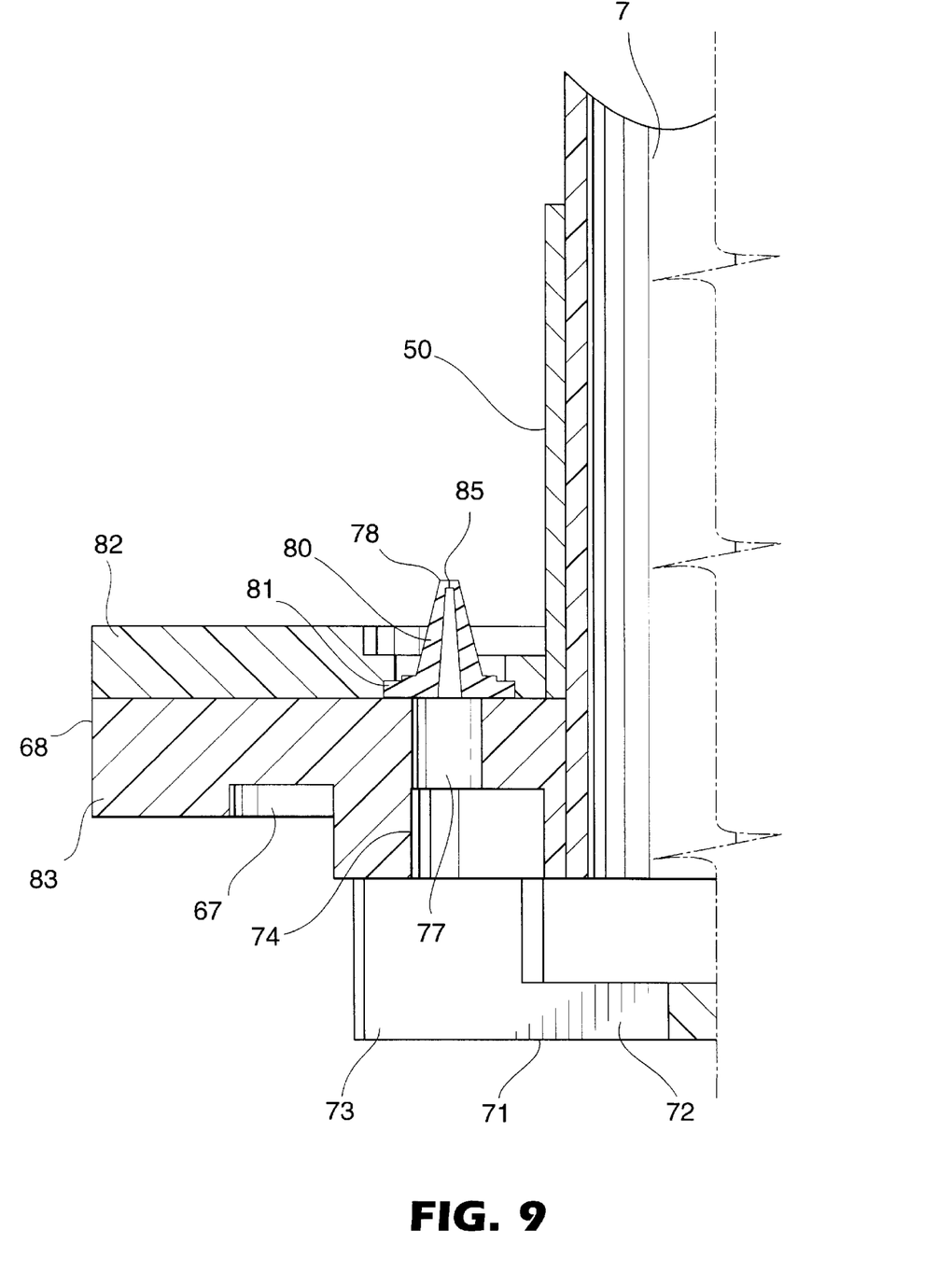
FIG. 9 is a cross section of one side of the top end of a valve body used in the device of FIGS. 1 to 3.

In order to backflush the particulate material in the bed 2, the flow of water in the apparatus is reversed, i.e. water is pumped down the tube 7 under pressure. The water enters the valve body 45 and pushes the ball 57 against the open top of the well 55. When the back pressure in the tube 7 builds up sufficiently, water entering the area between the top 30 of the piston 22 and the top of the sleeve 19 forces the piston 22 and consequently the cap 11 upwardly against the bias of the spring 16 (FIG. 4). When the piston 22 reaches the top of its stroke, the split ring 28 engages the bottom edge of the sleeve body 18. Pressure again builds up, and water then escapes from the valve body 45 via spaced apart holes 77 (FIGS. 6, 8 and 9) in the top wall 68 of the valve body. The holes 77 are normally closed by a second or intermediate valve defined by small nipples 78 at the upper discharge ends of the holes 77. As best shown in FIG. 9, each nipple 78 includes a generally frusto-conical body 80 with an annular flange 81 at the bottom end thereof. The flange 81 is sandwiched between top and bottom layers 82 and 83, respectively of the top wall 68 of the valve. A Slit 85 is provided in the top end of the body 80. When there is sufficient pressure build-up in the valve body 45, water jets upwardly through the slit 85. The upward flow of water draws particulate material through the gap between the hood 44 and the top wall 68 of the bottom valve into the bottom end of the casing 6. The water and particulate material flow upwardly by venturi action between the casing 6 and the tube 7 for discharge through the gap between the top end 10 of the casing and the cap 11. The steel sleeve 50 ensures that the bottom end of the tube 7 is not damaged by the particulate material.

The pressure of the water from the slits 85 dislodges foreign matter from the particulate material. Additional removal of contaminants occurs when (i) the particulate material hits the inside of the casing 6 and the outside of the tube 7 (ii) particulate material strikes the bottom surface 14 of the cap 11, and (iii) particulate material is dislodged laterally against the side wall of the tank 4. Most importantly, particulate material hits itself, i.e., particles propelled at high speed strike each other to clean the particulate material. The foreign matter is generally lighter than the mineral making up the particulate material. Consequently, the foreign matter remains in the water while the particulate mineral settles on top of the bed 2. The foreign matter is washed from the tank 4 with backwash water through a conventional port (not shown) to drain.

The operation described above occurs when the ball 57 fully blocks the top of the well 55 in the bottom end 56 of the valve body 45, or when the hole 58 in the ball 57 is partially aligned with the open top of the well 55. When the hole 58 is more or less fully aligned with the top of the well 55, water under pressure enters the particulate material via the inlet tubes 46 to stir up the material. Thus, the likelihood of cementing at the bottom of the bed is eliminated. If the hole 58 is fully aligned with the open top of the well, the water entering the valve body 45 from the tube 7 is discharged into the bed to stir up the latter. Sometimes there may be insufficient pressure to open the second valve in the top wall 68 of the valve body, and accordingly backflushing via the venturi may not occur. In any event, the bottom of the bed is stirred up in preparation for the next backflushing operation. Such complete or full alignment is believed to be infrequent and accordingly backflushing usually occurs when the flow of water in the tube 7 is reversed.

The use of the distributor 35 and the inlet tubes 46 ensure that substantially the entire bed 2 of particulate material is contacted by liquid during the service and regeneration cycles, and cleaned during backflushing. In the absence of the inlet tubes 46, water tends to hug the side of the casing 6, whereby substantial portions of the bed 2 are missed. With the slit-containing tubes 46, water enters or leaves the tubes 46 over a wide area at the bottom of the bed 2. Moreover, during backflushing, rather than striking the top of the distributor 35, some of the particulate material discharged from the top end 10 of the casing 6 is deflected inwardly by the side wall of the tank 4 onto the umbrella-shaped body 36 and is distributed towards the outer areas of the bed. Water seeking the center of the tank 4, i.e., the casing 6 will draw some of the particulate material toward the center of the tank, ensuring more or less even distribution of the bed material.

Upon completion of the backwashing operation, the flow of water downwardly in the tube 7 is stopped, whereupon the upward flow of water through the casing 6 ceases, because the valve defined by the nipples 78 closes. The spring 16 returns the piston 22 and the cap 11 to the rest position on the top end of the casing 6.

Similarly, during the service cycle, water entering the top (not shown) of the tank encounters the distributor 35 and is directed outwardly to the periphery of the tank. The water passes around the distributor 35 and is evenly distributed throughout the bed, i.e. over the entire top surface of the bed. Thus, even distribution of the water in the bed is ensured as it passes through the bed to the inlet tubes 46.

I claim:

1. A water conditioner comprising a tank for carrying a bed of particulate material; a backwash apparatus in the tank including a tubular casing for insertion into the bed; a vertical tube co-axial with said casing and extending through said casing beyond the ends thereof; a cap slidable on said vertical tube for movement between a closed position in which said cap closes an open top end of said casing and an open position in which said cap is spaced apart from said open top end of the casing; a first spring biasing said cap to the closed position; an opening in said tube for discharging water into said cap to cause the latter to move away from said casing to the open position; a first valve including a valve body closing the bottom end of said casing; inlet tubes on a bottom end of said valve body for introducing water from a large area of said bed into the bottom end of said first valve; a first passage in said body in fluid communication with the bottom end of said vertical tube, said first passage being normally open to the flow of water upwardly from the bed of particulate material into said vertical tube; ball means in said body for closing said first passage when the flow of water is reversed in said vertical tube; a second passage in the top of said body communicating with said first passage; a second valve normally closing said second passage for discharging water from said valve body when the flow of water is reversed in said vertical tube; a hood on said vertical tube above said valve body defining a venturi opening in the bottom end of said casing permitting the flow of particulate material into said casing, whereby, when during a backflush operation water is caused to flow downwardly in said tube means under pressure the first valve is closed with respect to the bed of particulate material, water passes through said first opening under pressure to move said cap to the open position, water passes through said second passage in said valve body to open said second valve, and water flows from the valve body upwardly into the bottom of said casing to create a venturi flow beneath said hood and in said casing which draws particulate material into the bottom end of said casing and discharges the water and particulate material through the open top end of the casing; and a distributor device including a collapsible body normally extending outwardly from immediately beneath said open top end of said casing in an open position; whereby, during the flow of liquid through said bed, said inlet tubes and said distributor ensure maximum contact between the liquid and the particulate material of the bed and, during backwashing of the bed, the distributor deflects particulate material towards the periphery of the bed.

2. A water conditioner according to claim 1, including second springs biasing said collapsible body to said open position and permitting collapsing of the collapsible body against the sides of the casing facilitating insertion of the backwash apparatus into the tank.

3. A water conditioner according to claim 2, wherein said collapsible body includes an annular sheet of plastic which is generally umbrella-shaped in the open position.

4. A water conditioner according to claim 3, including a sleeve retaining said collapsible body and said second springs on said casing.

5. A water conditioner according to claim 4, wherein each said second spring includes an inner vertical arm between said casing and said sleeve, a coil at the bottom of said vertical arm, and an inclined arm extending outwardly from said coil beneath said collapsible body.

6. A water conditioner according to claim 1, wherein said inlet tubes extend tangentially outwardly from said valve body the same distance as said distribution for functioning in conjunction therewith.

7. A water conditioner according to claim 6, wherein each said inlet tube includes a plurality of slits, said slits extending around a top surface of the tube from one side to the other side thereof for evenly admitting water to said valve body.

* * * * *